United States Patent
Peck et al.

(10) Patent No.: US 8,279,072 B2
(45) Date of Patent: Oct. 2, 2012

(54) SYSTEM TO MONITOR A CONSUMABLE PART AND METHOD TO MONITOR PERFORMANCE LIFE AND PREDICT MAINTENANCE THEREOF

(75) Inventors: Kevin B. Peck, Sonora, CA (US); Bjorn W. Larsson, Sonora, CA (US)

(73) Assignee: MRL Industries Inc., Sonora, CA (US)

( * ) Notice: Subject to any disclaimer, the term of this patent is extended or adjusted under 35 U.S.C. 154(b) by 827 days.

(21) Appl. No.: 12/404,746

(22) Filed: Mar. 16, 2009

(65) Prior Publication Data
US 2009/0231147 A1 Sep. 17, 2009

Related U.S. Application Data

(60) Provisional application No. 61/064,628, filed on Mar. 17, 2008.

(51) Int. Cl.
| | |
|---|---|
| G08B 17/00 | (2006.01) |
| G08B 21/00 | (2006.01) |
| H04Q 5/22 | (2006.01) |
| G01K 1/00 | (2006.01) |
| H01L 29/00 | (2006.01) |
| H05G 1/08 | (2006.01) |
| H05G 1/54 | (2006.01) |
| G05D 23/00 | (2006.01) |
| G06F 11/00 | (2006.01) |

(52) U.S. Cl. ............ 340/588; 340/640; 340/10.41; 702/130; 257/528; 378/91; 378/118; 700/299; 714/33

(58) Field of Classification Search ............ 340/588; 702/130
See application file for complete search history.

(56) References Cited

U.S. PATENT DOCUMENTS

| | | | |
|---|---|---|---|
| 5,526,293 | A | 6/1996 | Mozumder et al. |
| 5,923,553 | A | 7/1999 | Yi |
| 5,993,039 | A | 11/1999 | Crill |
| 6,314,385 | B1 | 11/2001 | Kim et al. |

(Continued)

OTHER PUBLICATIONS

Written Opinion of the Hungarian Intellectual Property Office to the Intellectual Property Office of Singapore for Singapore Patent Application No. 201006772-6, issued Oct. 27, 2011.

*Primary Examiner* — George Bugg
*Assistant Examiner* — Jack Wang
(74) *Attorney, Agent, or Firm* — Morgan, Lewis & Bockius LLP

(57) ABSTRACT

A method for determining a maintenance interval for a consumable part and/or for equipment containing a consumable part obtains a plurality of measurements of temperature of the consumable part, receives each of the measurements at a totalizing unit, correlates each of the measurements to one of a plurality of temperature subranges, accumulates for each of the subranges an amount of time the measurements of temperature were correlated to each of the subranges, determines a total time by aggregating the accumulated time for each subrange with a weighting function, and generates a signal to prompt a maintenance event when the total time equals or passes a runtime setpoint. In supplement to or in alternative to the above, the method also correlates a subrange of two sequential measurements, indexes a breakpoint register if the correlated subranges are different, and generates a signal to prompt a maintenance event when a value of the breakpoint register equals or passes a breakpoint setpoint. A system for collecting, storing, and displaying runtime data of a resistive heating element in a semiconductor processing unit is also disclosed.

28 Claims, 6 Drawing Sheets

U.S. PATENT DOCUMENTS

| | | |
|---|---|---|
| 6,351,517 B1 * | 2/2002 | Guru et al. ............... 378/91 |
| 6,532,555 B1 | 3/2003 | Miller et al. |
| 6,606,582 B1 | 8/2003 | Brinkman et al. |
| 7,110,035 B1 | 9/2006 | Hellstrand |
| 7,302,041 B2 * | 11/2007 | Deuringer et al. ........... 378/118 |
| 7,560,945 B2 * | 7/2009 | Singh .................. 324/750.3 |
| 2003/0055666 A1 * | 3/2003 | Roddy et al. ............... 705/1 |
| 2003/0093185 A1 * | 5/2003 | Patterson et al. ........... 700/299 |
| 2004/0012498 A1 * | 1/2004 | Peck et al. ................ 340/640 |
| 2004/0164935 A1 | 8/2004 | Dedene et al. |
| 2007/0001862 A1 | 1/2007 | Zweig |
| 2008/0140360 A1 * | 6/2008 | Goebel et al. ............... 703/2 |

* cited by examiner

FIG. 1A
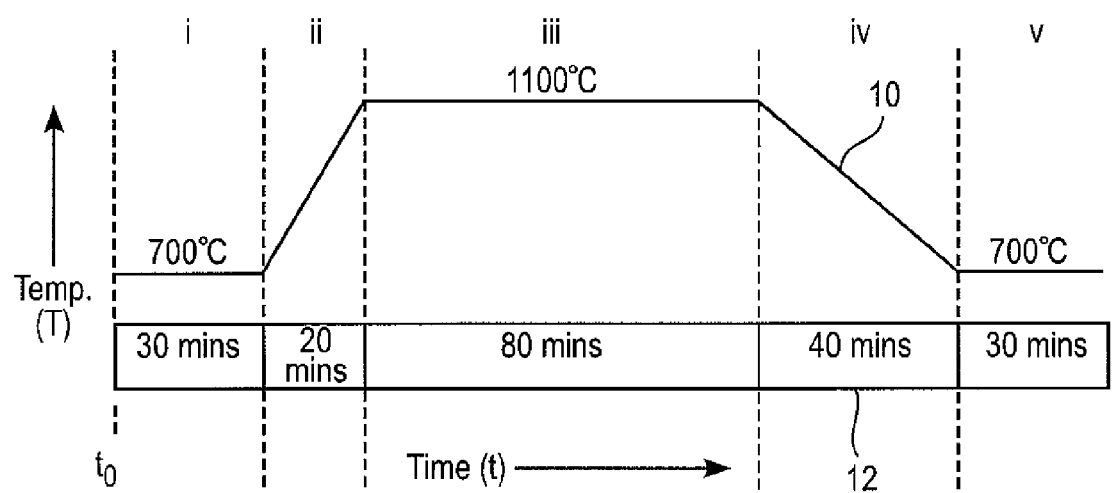
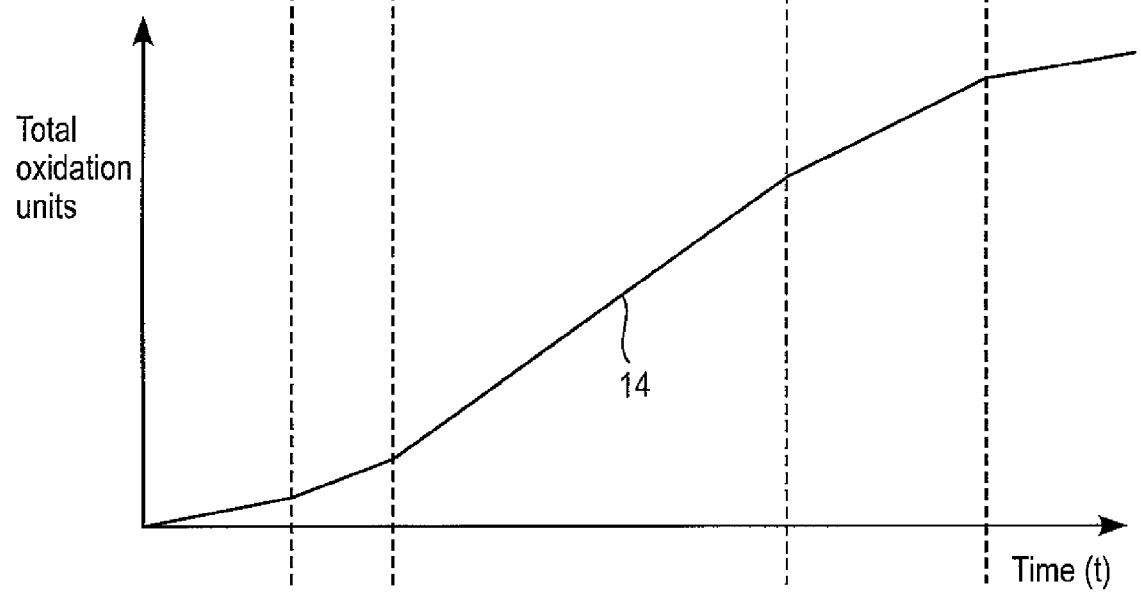
FIG. 1B

SYSTEM TO MONITOR A CONSUMABLE PART AND METHOD TO MONITOR PERFORMANCE LIFE AND PREDICT MAINTENANCE THEREOF

RELATED APPLICATION DATA

This application claims priority under 35 U.S.C. §119(e) to U.S. Provisional Application No. 61/064,628, filed Mar. 17, 2008, the entire contents of which are incorporated herein by reference.

FIELD

The present disclosure relates to a system and a method to monitor a consumable part, such as a resistive heating element in semiconductor processing equipment, and to collect information related to the performance life of the consumable part. More particularly, the present disclosure relates to collecting operating time information of a consumable part as a function of the time at a particular temperature, or alternatively, with other parameters that influence the performance life of the consumable part. The collected information assists in monitoring performance life and in predicting maintenance of the consumable part.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Certain parts, such as resistive heating elements in furnaces, are a consumable—over time, the parts fail for various reasons, such as oxidation of the materials from which they are made, and must be replaced. Unpredicted or unexpected failure of parts such as resistive heating elements is disruptive to operations. For example, if a failure occurs during operation, i.e., a semiconductor processing operation, the products in the furnace may be ruined and the investment in that product wasted. Also, a furnace with a failed resistive heating element must be cooled down for repair, impacting throughput and operational efficiencies.

Previously, lifetimes of consumable parts were estimated based on several methods.

One prior method visually inspected the consumable part, such as a resistive heating element, on a periodic basis. However, if deterioration occurs between inspection intervals, then the consumable part fails before the next inspection. Also, visual inspection usually requires the larger piece of equipment, such as a furnace, or the production operation, such as semiconductor processing, to be cooled down to room temperature with attendant impacts on productivity.

Another prior method tracks total operating hours of the equipment incorporating the consumable part, such as a furnace incorporating a resistive heating element. However, tracking total run hours does not discriminate between operation at various temperatures or temperature ranges.

For example, resistive heating elements deteriorate at different rates depending on operating temperature. Customers typically have several furnaces operating with different conditions as different times. Batch processes operate at various temperatures during one processing cycle. Simply counting total operating hours does not account for these variations and the variations' different impacts on operating lifetime.

A further prior method uses an empirical approach, running equipment until the consumable part fails and then setting a preventive maintenance schedule based on that observed failure time. The preventive maintenance schedule includes exchange of all consumable parts typically at a time period shorter than the observed time to failure. However, setting a preventive maintenance schedule in this manner is not an optimum solution. Such a preventive maintenance schedule is usually based on shortest life expectancy and an optional margin of error, without any consideration of the actual utilization. Thus, useable operating life remains when the preventive maintenance schedule is enacted, often a large amount of life time because consideration of differing temperatures during the use period has not been made.

SUMMARY

The systems and methods disclosed herein address the above noted issues by tracking operating time within several temperature ranges. This allows a detailed weighted analysis of usage to be computed for each consumable part and/or equipment. The weighted analysis can be based on a spline interpolation method applied to temperature subranges, based on integration of a weighted function over the time period of the active process period, or based on a hybrid of these two methods. The choice of a weighted analysis method can, in at least one instance, depend on a users need to access historical data for the monitored consumable part. The methods that use a subrange and accumulate data based on subranges of temperature would allow data related to each subrange being accessible for review and analysis.

In one exemplary embodiment, the consumable parts are a resistive heating element and/or other furnace parts. A replacement schedule so developed is then based on expected product life and can be continually adjusted based on actual temperature, number of process cycles and equipment utilization. Furthermore, the operating time is continuously adjusted and calculated so that an alarm can be set upon the approach to the predicted end-of-life.

An exemplary system for monitoring a lifetime of a consumable part of a piece of equipment comprises a totalizing unit to accumulate an amount of time spent at each of a plurality of temperature operating ranges of the piece of equipment, and a measuring unit to measure a temperature of the consumable part and in operable communication to the totalizing unit, wherein a temperature operating range is divided into a plurality of temperature subranges, and wherein the totalizing unit accumulates an amount of time the consumable part is at a temperature within each temperature subrange.

An exemplary system for monitoring a lifetime of a consumable part of a piece of equipment comprises a totalizing unit to accumulate an amount of time spent at each of a plurality of temperature operating ranges of the piece of equipment, and a measuring unit in operable communication to the totalizing unit, wherein the measuring unit measures at least one of a temperature of the consumable part and a parameter correlated to temperature of the consumable part, wherein a temperature operating range is divided into a plurality of temperature subranges, and wherein the totalizing unit accumulates an amount of time the consumable part is at a temperature within each temperature subrange.

An exemplary system for collecting, storing, and displaying runtime data of a consumable part in a piece of equipment comprises a plurality of measuring units to measure a temperature of the consumable part or to measure a parameter correlated to temperature of the consumable part, a totalizing unit to one or more of (a) accumulate an amount of time spent at each of a plurality of temperature operating subranges based on an output from the plurality of measuring units and (b) accumulate a number of breakpoints through which the output from the plurality of measuring units has transitioned, the breakpoints separating adjacent temperature subranges, a computer network for receiving and storing at least one of the accumulated time and the accumulated number of breakpoints, and a graphical user interface for displaying and retrieving at least one of the accumulated time and the accumulated number of breakpoints.

An exemplary method for determining a maintenance interval for equipment comprises the steps of obtaining a plurality of measurements of temperature of a consumable part or a plurality of measurements of a parameter correlated to temperature of the consumable part, receiving each of the measurements at a totalizing unit, correlating each of the measurements to one of a plurality of temperature subranges, accumulating for each of the subranges an amount of time the measurements were correlated to each of the subranges, and determining a total temperature normalized operating time for the consumable part by aggregating the accumulated time for each subrange with a weighting function, wherein a first temperature subrange is given a fractional weight relative to a second temperature subrange, the first temperature subrange being lower than the second temperature subrange.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which:

FIGS. 1A and 1B graphically illustrate an example of the temperature profile and the time profile for a process cycle and show as aggregation of the temperature normalized operating time.

DETAILED DESCRIPTION

Figure 2:
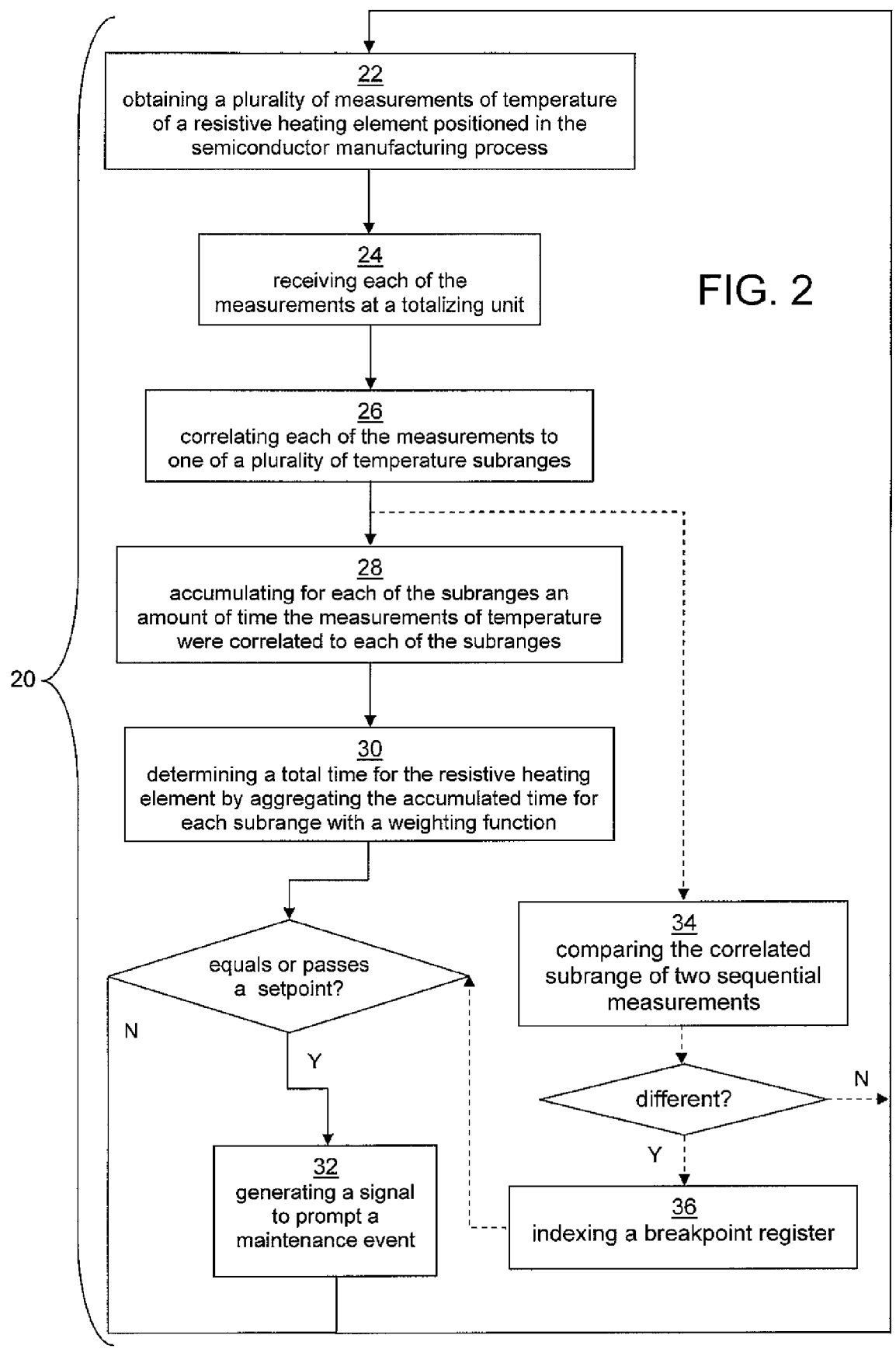
FIG. 2 is a flow chart representing process steps in an exemplary method to accumulate parameters relevant to performance life of a consumable part.

The time-at-temperature of a consumable part can be monitored to determine a maintenance interval for its preventive replacement. The number of heat-up and cool-down cycles can be monitored to similar effect and can optionally be included with monitoring the time-at-temperature information or can be used alternatively in place of monitoring the time-at-temperature information. Temperature can be measured directly or indirectly or through a proxy, such as supply current or flow rate of a supply gas.

FIG. 1A graphically illustrates an example of the temperature profile 10 and the time profile 12 for a process cycle. In the FIG. 1A example, the measured temperature of the resistive heating element at time $t_0$ is 700° C. The 700° C. temperature is maintained for 30 minutes (i) to time $t_0+30$ minutes (mins). A 20 minute heat-up period (ii) follows to bring the measured temperature to 1100° C., which is maintained for 80 minutes (iii). A subsequent 40 minute cool-down period (iv) brings the measured temperature to 700° C. (v). FIG. 1B shows graphically the aggregation of the temperature normalized operating time 14. The temperature normalized operating time 14 reflects that different temperatures contribute different amounts to or consume different amounts of the lifetime of the consumable part. Thus, the different temperature ranges are assigned different weights and the aggregation then reflects those different weights. For example, section (i) and section (v) are at the same temperature and have the same weighted value. This is reflected in those sections having the same slope. Also, for example, section (iii) with a higher temperature than section (i) has a larger weighted value. This is reflected in FIG. 1B by section (iii) having a larger slope than section (i).

The temperature of the consumable part is measured by any suitable means. For example, a co-located thermocouple can measure temperature. In another example, a current supplied to the resistive heating element can be calibrated to temperature or a flow rate of a combustion gas can be correlated to temperature.

Resistive hearing elements have a performance lifetime, after which they fail and no longer provide adequate, if any heating capability. The performance lifetime is limited by oxidation of the materials of the resistive heating element. The levels of oxidation approximately increase exponentially with increasing temperature. Therefore, the performance lifetime can be considered as proportional to the temperatures of operation of the resistive hearing element over the lifetime of the resistive heating element. In addition, thermal transitions, e.g., the heating-up and cooling-down of the resistive heating element, produces thermal stresses. These thermal stresses contribute to deterioration of the resistive heating element, including cracking and flaking. Other consumable parts with temperature dependent lifetimes have similar properties that can be exploited by the systems and methods disclosed herein to monitor lifetime and determine maintenance intervals.

An exemplary method for determining a maintenance interval measures a temperature of the consumable part or otherwise determines such a temperature and monitors the time-at-temperature and the number of thermal transitions. FIG. 2 illustrates such an exemplary method for a resistive heating element in the form of a flow chart. The FIG. 2 method 20 comprises obtaining a plurality of measurements of temperature of a resistive heating element positioned in the semiconductor manufacturing process 22 and receiving each of the measurements at a totalizing unit 24.

The FIG. 2 method 20 comprises correlating each of the measurements to one of a plurality of temperature subranges 26. A temperature subrange is a subset of temperatures of the larger operating temperature range for the consumable part. For example, an operating temperature range can be from a temperature minimum of, e.g., 0° C. or room temperature, to a maximum operating temperature. The maximum operating temperature is process dependent, but 1100° C. or 1300° C. can be used as an example for illustrative purposes.

Figure 3A:
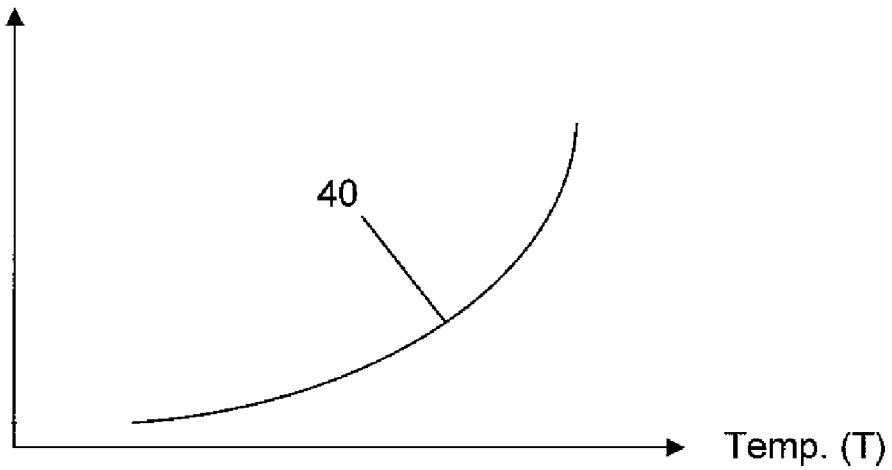
FIGS. 3a and 3b each show an idealized graph of oxidation level as a function of temperature.
Figure 3B:
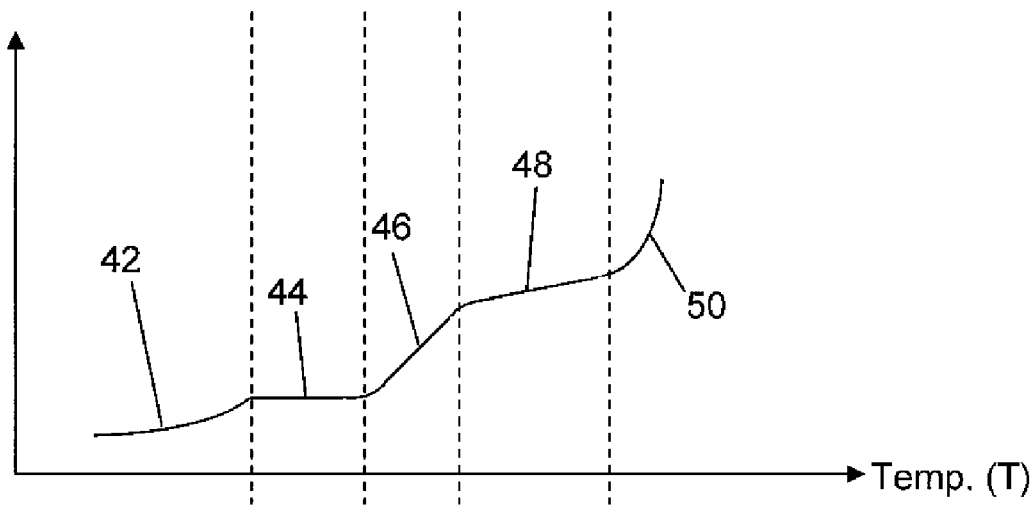

The temperature subranges can correspond to subsets of temperature in which the oxidation behavior of the consumable part is substantially the same or can otherwise be selected based on the oxidation-temperature profile. For example, if the oxidation level as a function of time exhibits plateaus or other features indicating substantially constant (i.e., ±10%)

oxidation levels over a range of temperatures, such a range can be assigned as a temperature subrange. In another example, if the oxidation level as a function of time is smoothly exponential, then the subsets of temperature can be arbitrarily assigned as, for example, every 100° C. or the temperature corresponding to every 10% change in oxidation level. Some of these examples are schematically illustrated, respectively, in FIG. 3a and FIG. 3b, where FIG. 3a shows a smoothly exponentially increasing oxidation level as a function of temperature 40 and FIG. 3b shows oxidation levels as a function of temperature with a first exponential increase 42, a plateau 44 of substantially constant oxidation level, a linearly increasing response 46, a region 48 of substantially constant oxidation levels, and a second exponential increase 50.

The exemplary method comprises accumulating for each of the subranges an amount of time the measurements of temperature were correlated to each of the subranges 28. For example and in reference to FIG. 1, the subrange to which a measured temperature of 700° C. would be correlated would have an accumulated amount of time of 30 minutes for the heating period represented in period (i).

In an exemplary embodiment, the method comprises determining a total time for the resistive heating element by aggregating the accumulated time for each subrange with a weighting function 30. For example, a first temperature subrange can be given a fractional weight relative to a second temperature subrange. In generally, the fractional weight should be related to the relative contribution that temperature provides to the oxidation of the material. For example, the oxidation level as a function of temperature generally increases with increasing temperature. Accordingly, a first temperature subrange lower than a second temperature subrange will have a smaller fractional weight. In an alternative approach, the oxidation level as a function of temperature can be normalized, with the resulting normalized oxidation values then used as the fractional weights for a given temperature subrange. A similar approach can be used to directly assign a fractional weight directly to the measured temperature, without correlating the measured temperature to a particular temperature subrange. In both cases, and as used herein, the weighting function results in a temperature normalized operating time.

Aggregating can be by any suitable method. In a first exemplary embodiment, aggregating is by summing with the weighting function. Here, each measurement time interval is modified, for example by multiplying or dividing, by the weighting function for that temperature or that subrange and then summed. In another exemplary embodiment, all of the time interval for a temperature or subrange is first totaled and then modified, for example by multiplying or dividing, by the weighting function for that temperature or that subrange. Of course, other mathematical operations can be used, depending on the inputs and the values of the weighting function.

An example of aggregating by summing with the weighting function follows: An oxidation unit ($U_c$) is defined as an amount of oxidation life consumed in a unit of time at a reference temperature by a consumable part. As an example, a 8.35 mm wire at 1000° C. for one hour can be used. The total lifetime would therefore be $NU_c$, where N is the number of hours. Temperature intervals (a) are then defined for the subranges:

$a_1$ is 0° C. to 500° C.
$a_2$ is 501° C. to 700° C.
$a_3$ is 701° C. to 1000° C.
$a_4$ is 1001° C. to 1300° C.
Weighting factors (w) are then defined:
$W_1$=0.25
$W_2$=0.5
$W_3$=1
$W_4$=2

Note that the weighting factor can be determined by matching the temperature subrange where one hour of operation correlates to one oxidation unit or other applicable sub-unit of total life or maintenance interval measurement and assigning that subrange a weighting factor of one. In the above case, subrange $a_3$ correlates to $U_c$ and has a weighting factor $W_3$. Considering the above, the total oxidation ($X_o$) expressed in $U_c$ is:

$$X_o = (W_1 a_1 + W_2 a_2 + W_3 a_3 + W_4 a_4 + \ldots + W_N a_N)$$

where N is the number of intervals. In general form, total oxidation can be expressed as:

$$X_\sigma = \sum_{i=1}^{N} (W_i a_i)$$

An example of an alternative accumulation method uses a weighting factor as a function of temperature (T) in a continuous function:

$$X_\sigma = \int_0^T f(T) dT$$

where $f(T) = W_T a$, where a is the accumulator and $W_T$ is the weighting function. The weighting function can be a curve fit function. This method is an integral-based method.

In an exemplary embodiment, the method comprises generating a signal to prompt a maintenance event when the total time equals or passes a runtime setpoint 32. An example of a maintenance event that can be prompted includes replacing the consumable part.

In an exemplary embodiment, the method comprises comparing the correlated subrange of two sequential measurements 34 and, if the correlated subranges are different, indexing a breakpoint register 36. When a value of the breakpoint register equals or passes a breakpoint setpoint, the method generates a signal to prompt a maintenance event 32. The value of the breakpoint register can be determined, optionally, by a weighting of the input to the breakpoint register similar to the weighting described for aggregating the accumulated time for each subrange. Correlating the subrange of two sequential measurements 34 and, if the correlated subranges are different, indexing a breakpoint register 36 can be optionally included in the method in supplement to or in replacement for determining a total time for the resistive heating element by aggregating the accumulated time for each subrange with a weighting function 30. An example of a maintenance event that can be prompted includes replacing the consumable part.

Passing a setpoint can be exceeding a preset value of a setpoint as a count is increased during aggregating. Passing a setpoint can also be falling below a preset value of a setpoint as aggregated time is subtracted from an initial value to fall below the setpoint. Of course, other mathematical operations can be used to manipulate the values and to meet the function of equaling or passing a runtime setpoint or a breakpoint setpoint.

Figure 4:
FIG. 4 is a conceptual illustration showing the aggregation of temperature normalized operating time and the indexing of breakpoints for the temperature profile and the time profile graphically illustrated in FIG. 1.

FIG. 4 is a conceptual illustration 60 showing the aggregation of time and the indexing of breakpoints for the exemplary temperature profile 10 and time profile 12 for the process cycle graphically illustrated in FIG. 1. In FIG. 4, the aggregation of time is collected by a first index 62, such as a segment totalizer, which is associated with a particular temperature or temperature range, and the number of transitions are collected by a second index 64, such as a transition or breakpoint counter, which is associated with a particular temperature or temperature range. FIG. 4 also illustrates, by example, the values for exemplary register values before and after the process cycle of FIG. 1. FIG. 4 illustrates an exemplary number of bins and exemplary temperature ranges and subranges, however, different number of bins and different temperature ranges and subranges. In particular, the number of temperature ranges and subranges is generally related to the batch processing method and is application specific and the number of bins is related to the oxidation properties of the resistive heating element.

In an exemplary embodiment, the method optionally includes remotely monitoring over a computer network the total time, the number of breakpoints, one or more setpoints or a status of a signal to prompt a maintenance event.

In an exemplary method, the method continues to loop through the process during at least a portion of the manufacturing process, preferably during the entire manufacturing process.

The above exemplary embodiments can be embodied in an exemplary system for control of a semiconductor processing unit that has a resistive heating element. These exemplary systems can themselves be embedded in (a) a control unit, (b) software saved at a control unit, at a computer or on a server, or (c) firmware. Other systems can be for control of other pieces of equipment with any type of consumable parts and can be similarly embedded in (a) a control unit, (b) software saved at a control unit, at a computer or on a server, or (c) firmware.

Figure 5A:
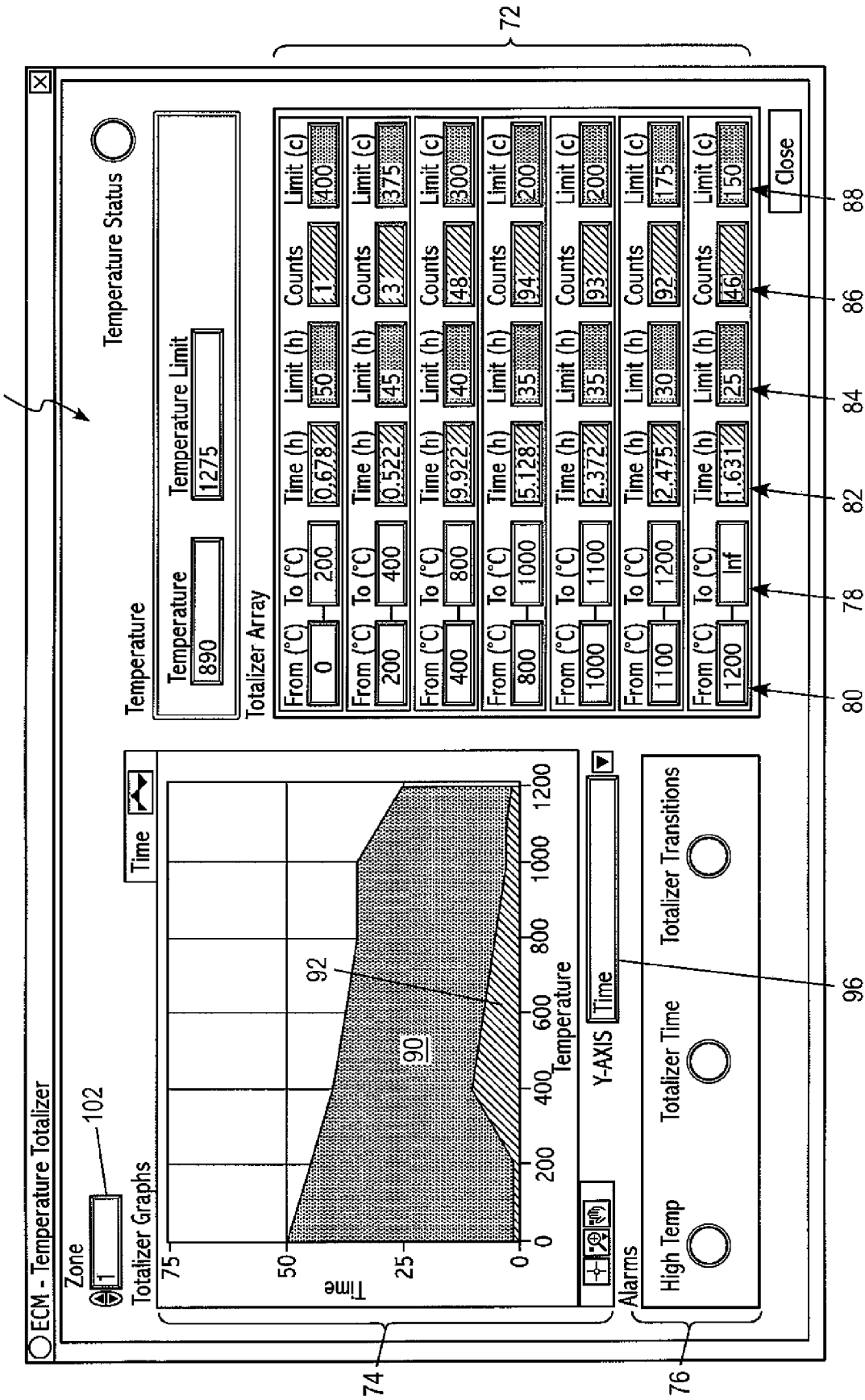
FIGS. 5A and 5B each show an exemplary embodiment of a graphical user interface displaying collected data, both numerically and graphically, and alarms for an exemplary embodiment of a system for monitoring a consumable part.
Figure 5B:
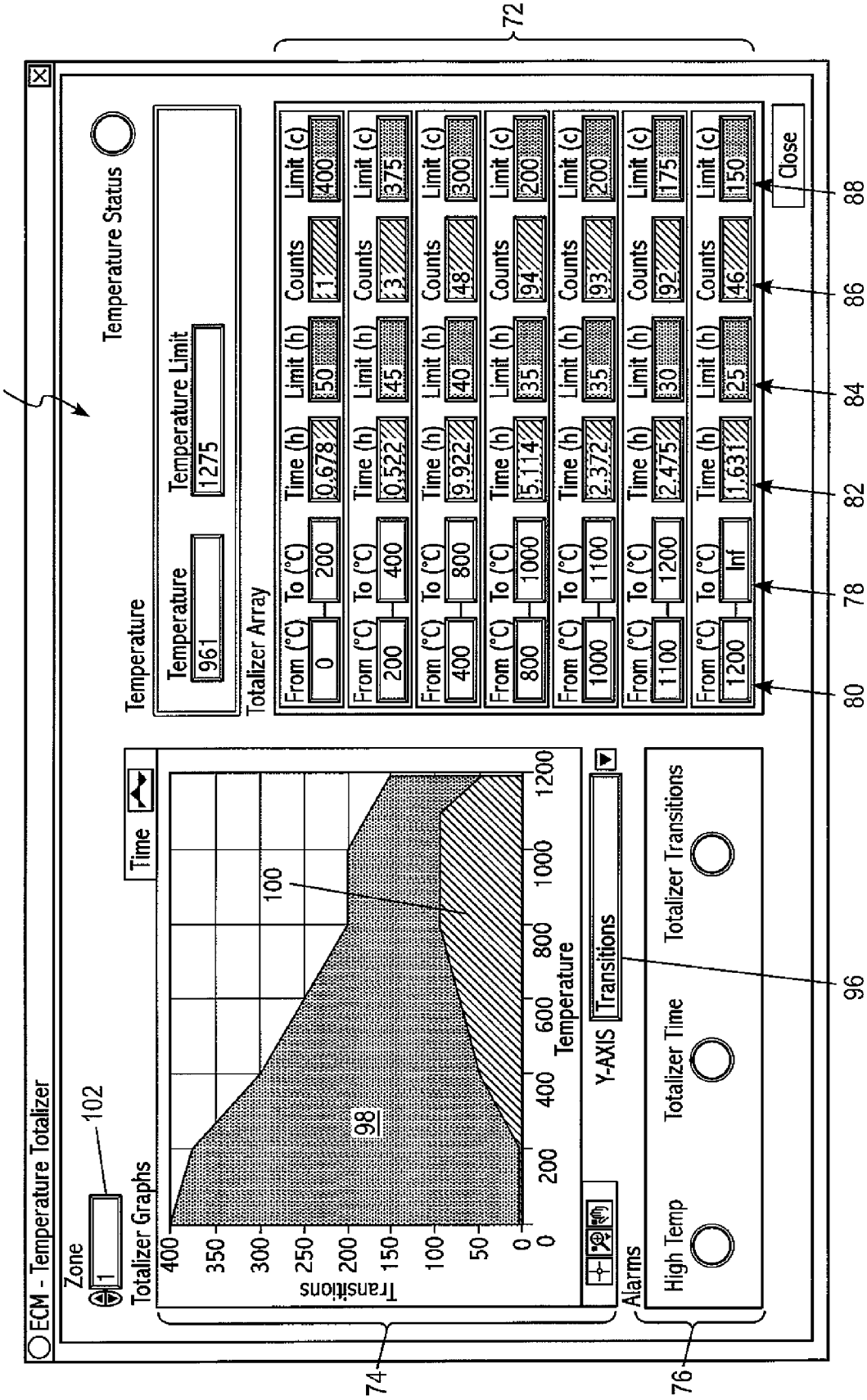

FIGS. 5A and 5B each show an exemplary embodiment of a graphical user interface displaying collected data, both numerically and graphically, and alarms for an exemplary embodiment of a system for monitoring a consumable part. In the exemplary embodiment of FIG. 5A, a graphical user interface 70 includes a numerical portion 72, a graph portion 74, and a signaling portion 76. In the numerical portion 72, multiple registers are displayed. The registers include an upper limit 78 and lower limit 80 of different temperature subranges. For each subrange, registers are included for an accumulated time 82 for the subrange and a setpoint 84 for the limit for that subrange. In addition, each subrange has a register of the number of transitions or breakpoints 86 associated with the respective subranges and a setpoint 88 for the limit of breakpoints for the subrange. In the graph portion 74, the time at temperature is displayed. In the graph portion 74 displaying time at temperature shown in FIG. 5A, a first trace 90 displays limit setpoints and a second trace 92 displays current accumulated time. In the signaling portion 76, condition signals 94, such as a lighted button, prompt a maintenance event when a selected register equals or passes a setpoint are included. Visual or audible condition signals can be used.

In the exemplary embodiment of FIG. 5B, the graphical user interface 70 is shown with the graph portion 74 selected to display transitions as a function of temperature. A selector 96 allows a user to switch between different parameters to display in the graph portion 74. In the graph portion 74 displaying transitions as a function of temperature shown in FIG. 5B, a first trace 98 displays limit setpoints and a second trace 100 displays current accumulated number of transitions.

The graphical user interface 70 is selectable to monitor and display different consumable parts. For example, an indexing feature 102 is included in the graphical user interface 70. The indexing feature 102 selects the input from different consumable parts to be displayed in the graphical user interface 70.

An exemplary graphical user interface can be developed with suitable software, such as LABVIEW® available from National Instruments.

The systems and methods disclosed herein can be applied to any consumable part, particularly a consumable part that has a temperature dependent operating lifetime or maintenance requirement, and more particularly a resistive heating element, for example a resistive heating element in a semiconductor processing unit.

In one example, an exemplary system for control of a semiconductor processing unit that has a resistive heating element comprises a totalizing unit to accumulate an amount of time spent at each of a plurality of temperature operating ranges of the semiconductor processing unit and a measuring unit positioned in the semiconductor processing unit to measure a temperature of the resistive heating element (or to determine a value of temperature via a proxy such as supply current) and in operable communication to the totalizing unit. The temperature operating range is divided into a plurality of temperature subranges, and the totalizing unit accumulates an amount of time the resistive heating element is at a temperature within each temperature subrange.

In another example, a system for collecting, storing, and displaying runtime data of a resistive heating element in a semiconductor processing unit comprises a plurality of measuring units positioned in the semiconductor processing unit to measure a temperature of the resistive heating element (or to determine a value of temperature via a proxy such as supply current), a totalizing unit to one or more of (a) accumulate an amount of time spent at each of a plurality of temperature operating subranges of the semiconductor processing unit based on an output of measured temperature from the plurality of temperature measuring units and (b) accumulate a number of breakpoints through which the measured temperature has transitioned, the breakpoints separating adjacent temperature subranges, a computer network for receiving and storing at least one of the accumulated time and the accumulated number of breakpoints, and a graphical user interface for displaying and retrieving at least one of the accumulated time and the accumulated number of breakpoints.

In an exemplary system, the measuring unit measures the temperature of each individual resistive heating element (or determines a value of temperature via a proxy such as supply current to each individual resistive heating element). Alternatively, the measuring unit measures the temperature of a group of resistive heating elements (or determines a value of temperature via a proxy such as supply current to a group of resistive heating elements) or a combination of the above.

In an exemplary system, the amount of time accumulated by the totalizing unit for each temperature subrange is aggregated by a weighting function, as described herein. Generally, a first temperature subrange is given a fractional weight relative to a second temperature subrange. An example of aggregating is addition, but other mathematical functions can be included alone or in combination. The choice of the aggregating function can influence the choice of the fractional weights. In another exemplary embodiment, adjacent temperature subranges are separated by a break point and the totalizing unit accumulates the number of breakpoints for the resistive heating element. The totalizing unit indexes a register for each breakpoint.

In an exemplary embodiment, the system generates a signal to prompt a maintenance event when the amount of aggregated time equals or passes a runtime setpoint and/or the number of accumulated breakpoints equals or passes a breakpoint setpoint. An example of a maintenance event includes replacing the resistive heating element. Other examples can include replacing other temperature sensitive parts of the semiconductor processing unit.

The above disclosed exemplary embodiments of the system and method have been described in reference to a consumable part and in the context of an operating lifetime that is time and/or temperature dependent. However, it should be appreciated that the same of similar approaches within the skill of one of ordinary skill in the art can be utilized for other alloys or materials that have a time and/or temperature dependent lifetime. For example, the consumable part can be a heating element, such as made from SiC or $MoSi_2$, can be a thermocouple or can be a quartz tube. Also, replacing is not the only maintenance event contemplated, other maintenance events such as cleaning, rotating, or inspecting can the maintenance event.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A system for monitoring a lifetime of a consumable part of a piece of equipment, the system comprising:
    a totalizing unit to accumulate an amount of time spent at each of a plurality of temperature operating ranges of the piece of equipment; and
    a measuring unit to measure a temperature of the consumable part and in operable communication to the totalizing unit,
    wherein a temperature operating range is divided into a plurality of temperature subranges,
    wherein the totalizing unit accumulates an amount of time the consumable part is at a temperature within each temperature subrange, and
    wherein the consumable part includes a heating element, a thermocouple or a quartz tube.

2. The system of claim 1, wherein the amount of time accumulated by the totalizing unit for each temperature subrange is aggregated by a weighting function, and wherein a first temperature subrange is given a fractional weight relative to a second temperature subrange, the first temperature subrange being lower than the second temperature subrange.

3. The system of claim 2, wherein a signal is generated to prompt a maintenance event when the amount of time aggregated by the totalizing unit equals or passes a runtime setpoint.

4. The system of claim 2, wherein the amount of time accumulated by the totalizing unit for each temperature subrange is aggregated by summing with the weighting function.

5. The system of claim 1, wherein adjacent temperature subranges are separated by a break point and the totalizing unit accumulates the number of breakpoints.

6. The system of claim 5, wherein the totalizing unit indexes a register for each breakpoint, and wherein a signal is generated to prompt a maintenance event when the register is equal to or passes a breakpoint setpoint.

7. The system of claim 1, wherein the totalizing unit accumulates a number of transitions between each temperature subrange.

8. The system of claim 1, wherein the system is embedded in (a) a control unit, (b) software saved at a control unit, at a computer or on a server, or (c) firmware.

9. The system of claim 1, wherein the piece of equipment is a semiconductor processing unit and the consumable part includes a resistive heating element.

10. A system for monitoring a lifetime of a consumable part of a piece of equipment, the system comprising:
    a totalizing unit to accumulate an amount of time spent at each of a plurality of temperature operating ranges of the piece of equipment; and
    a measuring unit in operable communication to the totalizing unit,
    wherein the measuring unit measures at least one of a temperature of the consumable part and a parameter correlated to temperature of the consumable part,
    wherein a temperature operating range is divided into a plurality of temperature subranges,
    wherein the totalizing unit accumulates an amount of time the consumable part is at a temperature within each temperature subrange, and
    wherein the consumable part includes a heating element, a thermocouple or a quartz tube.

11. The system of claim 10, wherein the parameter correlated to temperature is a supply current or a gas flow rate.

12. A system for collecting, storing, and displaying runtime data of a consumable part in a piece of equipment, the system comprising:
    a plurality of measuring units to measure a temperature of the consumable part or to measure a parameter correlated to temperature of the consumable part;
    a totalizing unit to one or more of (a) accumulate an amount of time spent at each of a plurality of temperature operating subranges based on an output from the plurality of measuring units and (b) accumulate a number of breakpoints through which the output from the plurality of measuring units has transitioned, the breakpoints separating adjacent temperature subranges;
    a computer network for receiving and storing at least one of the accumulated time and the accumulated number of breakpoints; and
    a graphical user interface for displaying and retrieving at least one of the accumulated time and the accumulated number of breakpoints,
    wherein the consumable part includes a heating element, a thermocouple or a quartz tube.

13. The system of claim 12, wherein the piece of equipment is a semiconductor processing unit.

14. The system of claim 13, wherein the consumable part includes a resistive heating element.

15. The system of claim 12, wherein the parameter correlated to temperature is a supply current or a gas flow rate.

16. The system of claim 12, wherein the amount of time accumulated by the totalizing unit for each temperature subrange is aggregated by a weighting function, wherein a first temperature subrange is given a fractional weight relative to a second temperature subrange, the first temperature subrange being lower than the second temperature subrange.

17. The system of claim 16, wherein a signal is generated to prompt a maintenance event when the amount of time aggregated by the totalizing unit equals or passes a runtime setpoint.

18. The system of claim 16, wherein the totalizing unit indexes a register for each breakpoint, and wherein a signal is generated to prompt a maintenance event when the register is equal to or passes a breakpoint setpoint.

19. The system of claim 12, wherein the totalizing unit indexes a register for each breakpoint, and wherein a signal is generated to prompt a maintenance event when the register is equal to or passes a breakpoint setpoint.

20. The system of claim 12, wherein the system is embedded in (a) a control unit, (b) software saved at a control unit, at a computer or on a server, or (c) firmware.

21. A method for determining a maintenance interval for equipment, the method comprising the steps of:
obtaining a plurality of measurements of temperature of a consumable part or a plurality of measurements of a parameter correlated to temperature of the consumable part;
receiving each of the measurements at a totalizing unit;
correlating each of the measurements to one of a plurality of temperature subranges;
accumulating for each of the subranges an amount of time the measurements were correlated to each of the subranges; and
determining a total temperature normalized operating time for the consumable part by aggregating the accumulated time for each subrange with a weighting function, wherein a first temperature subrange is given a fractional weight relative to a second temperature subrange, the first temperature subrange being lower than the second temperature subrange,
wherein the consumable part includes a heating element, a thermocouple or a quartz tube.

22. The method of claim 21, wherein the piece of equipment is a semiconductor processing unit.

23. The method of claim 22, wherein the consumable part includes a resistive heating element.

24. The method of claim 21, wherein the parameter correlated to temperature is a supply current or a gas flow rate.

25. The method of claim 21, comprising generating a signal to prompt a maintenance event when the total temperature normalized operating time equals or passes a runtime setpoint.

26. The method of claim 21, wherein aggregating is by summing with the weighting function.

27. The method of claim 21, comprising:
comparing the correlated subrange of two sequential measurements;
if the correlated subranges are different, indexing a breakpoint register; and
generating a signal to prompt a maintenance event when a value of the breakpoint register equals or passes a breakpoint setpoint.

28. The method of claim 21, comprising remotely monitoring the total temperature normalized operating time over a computer network.

* * * * *